United States Patent
Wei et al.

(10) Patent No.: US 12,153,963 B2
(45) Date of Patent: Nov. 26, 2024

(54) STARTING AN ALTERNATIVE DEVICE AFTER QUERYING A KNOWLEDGE GRAPH FOR ALTERNATIVE DEVICES ASSOCIATED WITH AN INTENDED FUNCTION

(71) Applicants: Gree Electric Appliances, Inc. of Zhuhai, Guangdong (CN); Zhuhai Leayun Technology Co., Ltd, Zhuhai (CN)

(72) Inventors: Deping Wei, Guangdong (CN); Jutao Jia, Guangdong (CN); Zirong Huang, Guangdong (CN); Zhihua Hu, Guangdong (CN); Guangxu Hu, Guangdong (CN)

(73) Assignees: Gree Electric Appliances, Inc. of Zhuhai, Zhuhai (CN); Zhuhai Leayun Technology Co., Ltd, Zhuhai (CN)

( * ) Notice: Subject to any disclaimer, the term of this patent is extended or adjusted under 35 U.S.C. 154(b) by 382 days.

(21) Appl. No.: 17/623,677

(22) PCT Filed: Jul. 6, 2020

(86) PCT No.: PCT/CN2020/100339
§ 371 (c)(1),
(2) Date: Dec. 29, 2021

(87) PCT Pub. No.: WO2021/027437
PCT Pub. Date: Feb. 18, 2021

(65) Prior Publication Data
US 2022/0276897 A1 Sep. 1, 2022

(30) Foreign Application Priority Data
Aug. 12, 2019 (CN) .......................... 201910739694.3

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01)

(58) Field of Classification Search
CPC ............. G06F 16/36; G06F 17/27; G06F 3/01
See application file for complete search history.

(56) References Cited

U.S. PATENT DOCUMENTS 6,226,627 B1 * 5/2001 Polak ..................... G06N 5/046
706/14
2001/0052995 A1 * 12/2001 Idehara ................. G06F 3/1285
358/1.15

(Continued)

FOREIGN PATENT DOCUMENTS

CN 105611023 A 5/2016
CN 105864976 A 8/2016

(Continued)

OTHER PUBLICATIONS

International Search Report, with a mailing date of Sep. 28, 2020, in International application No. PCT/CN2020/100339, filed on Jul. 6, 2020 (6 pages).

(Continued)

*Primary Examiner* — Jorge A Chu Joy-Davila
(74) *Attorney, Agent, or Firm* — McAndrews, Held & Malloy, Ltd.

(57) ABSTRACT

A resource scheduling method and system, and a computer-readable storage medium are provided. The method comprises: a control instruction inputted by a user (S101) is acquired; on the basis of the control instruction, an intended device (S102) is determined; in the case where the intended device is not able to be started, with regard to each function of the intended device, a constructed knowledge graph is (Continued)

queried for alternative devices associated with the function, the knowledge graph having a plurality of functions stored therein as well as devices associated with the plurality of functions (S103, S105); and a device to be started is determined from all the alternative devices and starting the determined device (S106). In the resource scheduling method, in the case where an intended device specified by a user is not able to be started, alternative devices are appropriately determined.

13 Claims, 4 Drawing Sheets

(56) References Cited

U.S. PATENT DOCUMENTS

2009/0031222 A1* 1/2009 Nakamura ............... G06F 30/18
715/735

2016/0189028 A1 6/2016 Hu et al.
2018/0197215 A1* 7/2018 Toriumi ............. H04N 1/00474
2020/0380578 A1* 12/2020 Xu ......................... G06N 20/00

FOREIGN PATENT DOCUMENTS

| CN | 106125567 | * | 8/2016 |
| CN | 106713083 | A | 5/2017 |
| CN | 107346115 | A | 11/2017 |
| CN | 207802669 | U | 8/2018 |
| CN | 108923969 | A | 11/2018 |
| CN | 109754804 | A | 5/2019 |
| CN | 109995620 | A | 7/2019 |
| CN | 110457489 | A | 11/2019 |

OTHER PUBLICATIONS

Priority First Office Action dated Sep. 1, 2021, for application No. CN 201910739694.3, filed on Aug. 12, 2019 (1 page).

* cited by examiner

STARTING AN ALTERNATIVE DEVICE AFTER QUERYING A KNOWLEDGE GRAPH FOR ALTERNATIVE DEVICES ASSOCIATED WITH AN INTENDED FUNCTION

The disclosure is a 371 of International Patent Application No. PCT/CN2020/100339, filed July 6, 2020, which claims priority to Chinese Patent Application No. 201910739694.3 filed Aug. 12, 2019 with the CNIPA, with the disclosure title of "A Resource Scheduling Method and System, and a Computer-Readable Storage Medium", the disclosure of which are incorporated herein by reference in their entireties.

TECHNICAL FIELD

The disclosure relates to the technical field of electric curtains, specifically relating to a resource scheduling method and system, and a computer-readable storage medium.

BACKGROUND

As the Internet technology and industry develop and user's living standards are improved, people put forward higher requirements for systems. In the context of big data, there are more personalized choices for resource scheduling in the system.

However, personalized resource scheduling policies are currently unavailable. Therefore, a corresponding resource scheduling mechanism is urgently needed to meet this demand and enhance the user experience.

SUMMARY

The disclosure aims to solve the technical problem that personalized resource scheduling policies are currently unavailable. In order to solve the above technical problem, the disclosure provides a resource scheduling method and system, and a computer-readable storage medium.

A resource scheduling method is provided according to an aspect of the disclosure, wherein the method includes:
  acquiring a control instruction inputted by a user;
  on a basis of the control instruction, determining an intended device;
  in the case where the intended device is not able to be started, with regard to each function of the intended device, querying a constructed knowledge graph for alternative devices associated with the function, the constructed knowledge graph having a plurality of functions stored therein as well as devices associated with the plurality of functions; and
  determining a device to be started from all the alternative devices and starting the determined device.

In some embodiments, the control instruction is a voice instruction, and
  determining an intended device on the basis of the control instruction includes: performing semantic parsing on the voice instruction, and determining the intended device on the basis of a semantic parsing result.

In some embodiments, determining the device to be started from all the alternative devices includes:
  showing the user a prompt message which records all the alternative devices;
  receiving a feedback message from the user for the prompt message, wherein the feedback message indicates the device selected by the user from all the alternative devices; and
  determining the device to be started according to the feedback message.

In some embodiments, the knowledge graph further stores a connection weight between a function and a device, and the connection weight increases with increasing of a probability that the user selects the device with regard to a function, and
  determining one from all the alternative devices as a device to be started includes:
  sequencing the connection weights associated with all the alternative devices; and
  determining an alternative device corresponding to a largest connection weight as the device to be started.

In some embodiments, the connection weight between the function and the device is reflected by a length of a path connecting the function to the device.

In some embodiments, the greater the connection weight between the function and the device, the shorter the path connecting the function to the device.

In some embodiments, the method further includes constructing the knowledge graph before obtaining the control instruction inputted by the user, including:
  determining a device list to be scheduled, and recording each device in the device list in the knowledge graph;
  summarizing the functions of all devices in the device list into a function list, and recording each function in the function list in the knowledge graph; and
  with regard to each function, connecting the function to devices with the function through a path.

In some embodiments, constructing the knowledge graph further includes:
  with regard to each function, performing the following steps:
  acquiring a record of selecting the device by the user for the function; and
  on a basis of the record, determining connection weights between the function and the respective devices with the function, and adjusting path lengths between the function and the respective devices with the function based on the connection weights.

A resource scheduling system is provided according to an aspect of the disclosure, wherein the system includes:
  an instruction acquiring module configured to acquire a control instruction inputted by a user;
  an intent determining module configured to determine an intended device on a basis of the control instruction;
  a storage module configured to store a constructed knowledge graph, wherein the constructed knowledge graph has a plurality of functions stored therein as well as devices associated with the plurality of functions;
  a querying module configured to query the constructed knowledge graph for alternative devices associated with the function, with regard to each function of the intended device, in the case where the intended device is not able to be started; and
  a starting module configured to determine a device to be started from all the alternative devices and start the determined device.

A computer-readable storage medium is provided according to an aspect of the disclosure. A computer program is stored therein, and the computer program implements the resource scheduling method when executed by a processor.

Compared with the related art, one or more embodiments in the above solution may have the following advantages or beneficial effects:
  In the case where the intended device specified by the user is not able to be started, the resource scheduling method in the disclosure is used to reasonably determine alternative devices according to the correlation relationship between the function and the device in the constructed knowledge graph and determine the device to be started from all the alternative devices and start the determined device. The disclosure solves the problem that personalized resource scheduling is unavailable in the related art, improves the personalization of systems, meets the scheduling requirements of different resources, and enhances the user experience.

BRIEF DESCRIPTION OF THE DRAWINGS

The scope of the disclosure can be better understood by reading the following detailed description of exemplary embodiments in conjunction with the drawings. The drawings herein are as follows.

DETAILED DESCRIPTION OF THE EMBODIMENTS

In order to make the objective, technical solutions and advantages of the disclosure clearer, implementation methods of the disclosure will be fully described with reference to drawings and embodiments. In this way, the implementation process in which technical problems are solved and technical effects are achieved by the disclosure with technical solutions will be fully understood and implemented.

Personalized resource scheduling policies are currently unavailable. In order to solve the above technical problem, a resource scheduling method is provided in the embodiments of the disclosure.

Embodiment I

Figure 1:
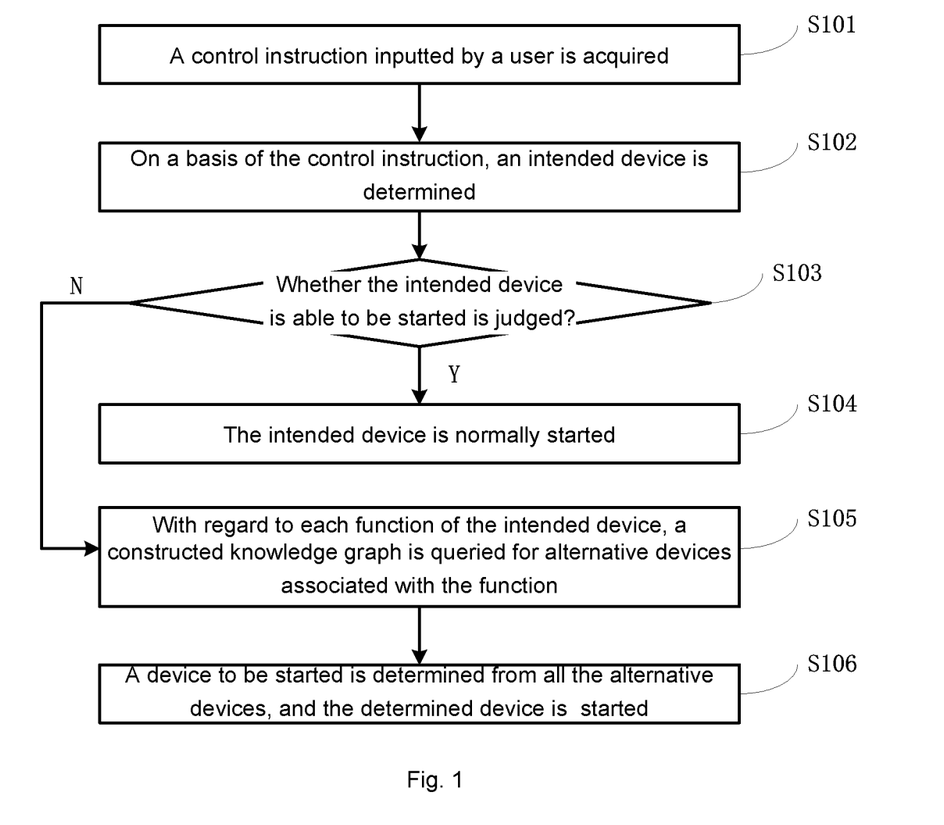
FIG. 1 illustrates a flow chart of a resource scheduling method according to an embodiment of the disclosure.

FIG. 1 illustrates a flow chart of a resource scheduling method according to an embodiment of the disclosure. As shown in FIG. 1, the resource scheduling method according to an embodiment of the disclosure mainly includes steps S101-S106.

In step S101, a control instruction inputted by a user is acquired.

As at least one alternative embodiment, the user may input the control instruction through a remote controller or directly through voice instructions.

In step S102, an intended device is determined on the basis of the control instruction.

As at least one alternative embodiment, the control instruction entered by the user is analyzed to confirm the device that the user wants to start ("the intended device").

In case that the control instruction is a voice instruction, the step further includes performing semantic parsing on the voice instruction, and determining the intended device on the basis of results of the semantic parsing. Persons in this field may use the common semantic parsing methods in the related art to parse the semantics of voice instructions, so as to obtain intended devices, which will not be explained herein.

In step S103, whether the intended device may be started is determined.

In step S104, the intended device is started normally if it able to be started.

In step S105, in the case where the intended device is not able to be started, a constructed knowledge graph is queried for alternative devices associated with the function, with regard to each function of the intended device. The knowledge graph has a plurality of functions stored therein as well as devices associated with the plurality of functions.

As at least one alternative embodiment, in case that the intended device is not able to be started because of the device itself or external configuration (such as power failure and network outage), the resource scheduling system determines the alternative devices of the intended device in combination with the pre-constructed knowledge graph.

Figure 2:
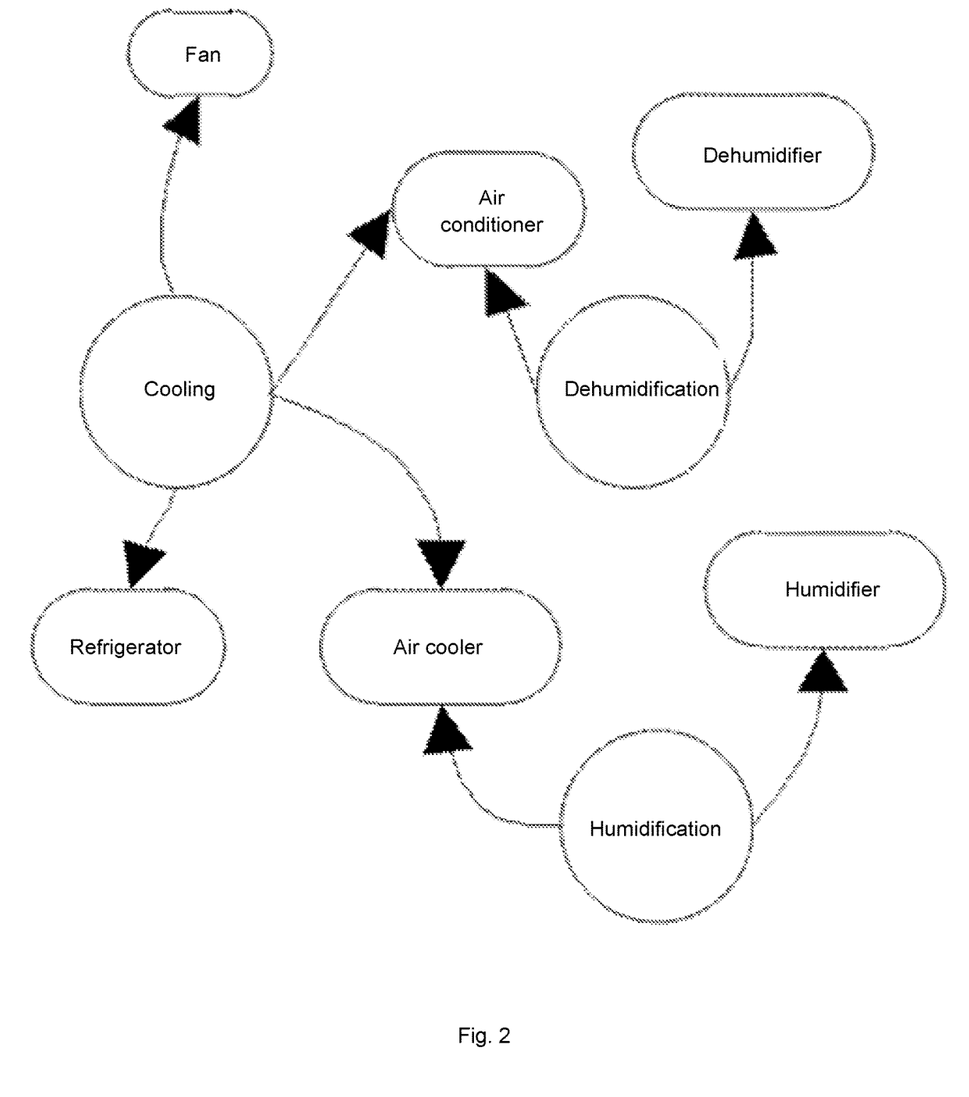
FIG. 2 illustrates a schematic diagram of a knowledge graph according to an embodiment of the disclosure.

FIG. 2 illustrates a schematic diagram of a knowledge graph according to an embodiment of the disclosure. As shown in FIG. 2, the knowledge graph has three functions stored therein as well as devices associated with the functions. The knowledge graph has functions of cooling, dehumidification and humidification function. Devices associated with cooling are fans, air conditioners, refrigerators and air coolers, and those with dehumidification are air conditioners and dehumidifiers, and those with humidification are air coolers and humidifier. It can be seen that the system constructs knowledge graphs for resources of different types and functions by classifying various resources. For example, the knowledge graph of household appliances is constructed by connecting various electrical appliances directly or indirectly by property or function. For example, both air conditioners and fans have the property of cooling, so air conditioners and fans are connected by cooling property; both air conditioners and dehumidifiers have the dehumidification function, so air conditioners and dehumidifiers are directly connected by dehumidification property, and fans and dehumidifiers are connected indirectly.

In the event that an air conditioner, the intended device indicated by the user, is not able to be started, the system determines alternative devices, including a fan, a refrigerator and an air cooler associated with the cooling function of the air conditioner, as well as a dehumidifier associated with the dehumidification function of the air conditioner.

In step S106, a device to be started is determined from all the alternative devices and the determined device started.

As an example embodiment, the device to be started may be determined by further querying the user or according to connection weights stored in the knowledge graph. The disclosure will be further described below with reference to FIG. 3 and FIG. 4.

Figure 3:
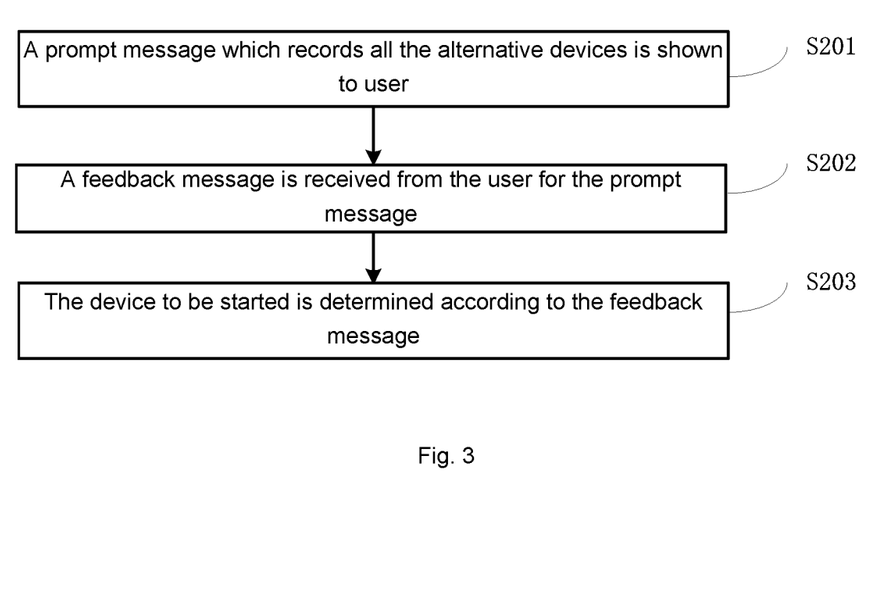
FIG. 3 illustrates a flow chart of determining one from all the alternative devices as a device to be started according to an embodiment of the disclosure.

FIG. 3 illustrates a flow chart of determining a device to be started from all the alternative devices according to an embodiment of the disclosure. As shown in FIG. 3, the step of determining the device to be started from all the alternative devices includes steps S201-S203.

In step S201, the user is provided with a prompt message which records all the alternative devices.

In step S202, a feedback message is received from the user for the prompt message. The feedback message indicates the device selected by the user from all the alternative devices.

In step S203, the device to be started is determined in accordance with the feedback message.

In the embodiment, the prompt message recording all the alternate devices is displayed by the client, so that the user can select one from all the alternate devices as the device to be started.

Figure 4:
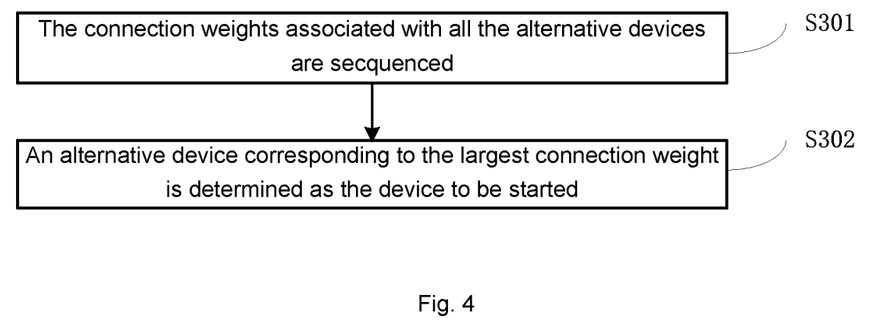
FIG. 4 illustrates another flow chart of determining one from all the alternative devices as a device to be started according to an embodiment of the disclosure.

FIG. 4 illustrates a flow chart of determining the device to be started from all the alternative devices according to an embodiment of the disclosure. In the embodiment, the knowledge graph further stores a connection weight between the function and the device, and the connection weight increases with the increasing of a probability that the user selects the device with regard to the function; the connection weight between the function and the device is reflected by a length of a path connecting the function to the device; and the greater the connection weight between the function and the device, the shorter the path connecting the function to the device.

As shown in FIG. 4, the device to be started is determined from all the alternative devices, including step S301 and step S302.

In step S301, the connection weights associated with all the alternative devices are sequenced.

In step S302, an alternative device corresponding to the largest connection weight is determined as the device to be started.

In the embodiment, a device frequently selected by the user is selected from all the alternative devices as a device to be started through the connection weights in the knowledge graph.

The device to be started is started after being determined.

Figure 5:
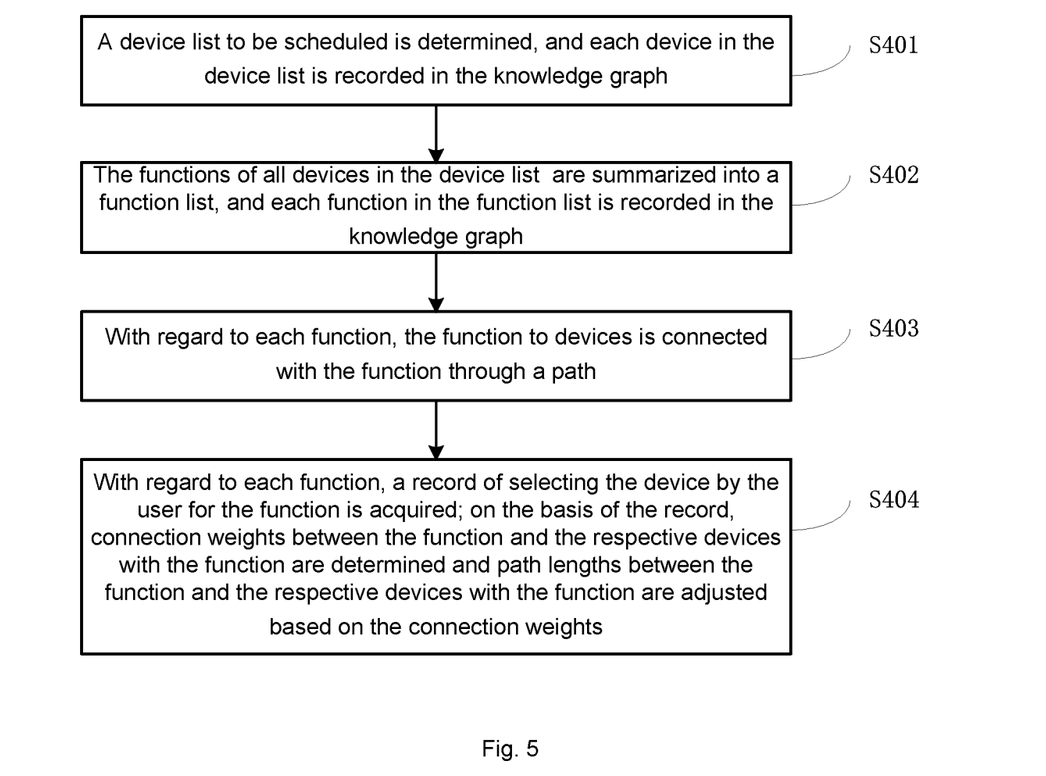
FIG. 5 illustrates a flow chart of constructing the knowledge graph according to an embodiment of the disclosure.

In one preferable embodiment of the disclosure, the knowledge graph needs to be pre-constructed offline before the execution of step S101. FIG. 5 illustrates a flow chart of constructing the knowledge graph according to an embodiment of the disclosure. As shown in FIG. 5, the method of constructing the knowledge graph mainly includes steps S401-S404.

In step S401, a device list to be scheduled is determined, and each device in the device list is recorded in the knowledge graph.

In step S402, the functions of all devices in the device list are summarized into a function list, and each function in the function list is recorded in the knowledge graph.

In step S403, with regard to each function, the function is connected to devices with the function through a path.

In step S404, with regard to each function, a record of selecting the device by the user for the function is acquired; and on the basis of the record, connection weights between the function and the respective devices with the function are determined and path lengths between the function and the respective devices with the function are adjusted based on the connection weights.

Taking the knowledge graph shown in FIG. 2 as an example, the list of devices to be scheduled is first determined. In the list, there are six devices: fan, air conditioner, refrigerator, air cooler, dehumidifier and humidifier. The function list can be obtained by summarizing the functions of these six devices. There are functions of cooling, dehumidification and humidification in the list.

The devices in the device list and the functions in the function list are saved in the knowledge graph. In addition, a function is connected to the devices associated with the function by path, and the length of the path represents the connection weight. The shorter the path, the greater the connection weight, and the greater the probability that the user will choose the device with regard to the function. On the contrary, the longer the path, the smaller the connection weight, and the smaller the probability that the user will choose the device with regard to the function, thus constructing the knowledge graph including the function, device and path.

In the case where the intended device specified by the user is not able to be started, the resource scheduling method in the embodiment is used to reasonably determine alternative devices according to the correlation relationship between the function and the device in the constructed knowledge graph and determine the device to be started from all the alternative devices and start the determined device. It can be seen that the embodiment of the disclosure solves the problem that personalized resource scheduling is unavailable in the related art, improves the personalization of systems, meets the scheduling requirements of different resources, and enhances the user experience. In addition, the system builds a knowledge graph according to the relationship between devices and the user's preference for devices to schedule resources, which makes the scheduling results more inclined to the real choice of the user and helps to further enhance the user experience.

Embodiment II

The method of constructing the knowledge graph and scheduling resources based on the knowledge graph according to the embodiment of the disclosure will be described below with reference to FIG. 2.

Firstly, the connection is established based on the properties of electrical equipment ("entities"). For example, the air conditioner has the functions of cooling and dehumidification, while the dehumidifier also has the function of dehumidification. In terms of the function of dehumidification, the air conditioner is connected to the dehumidifier by the property of dehumidification. Meanwhile, the user's daily precise control of the devices will be recorded by the cloud server. For example, if the user starts the dehumidifier, the cloud server will record the use of the dehumidifier, and if the user also enables the dehumidification function of the air conditioner, the cloud server will also make records. On the basis of the historical data and the property relationship between the devices, a weight value is then determined between a property and an entity, and the weight value increases with the increasing of the user's use frequency of the device. In short, the weight value is the length of the connection (path). The larger the weight value, the shorter the path. The corresponding user knowledge graph is established on the basis of the relationship.

Through the user's use of system resources, his/her preferences for resources required by each operation are recorded on the cloud server, such as the common resource 1 of the user 1. The system inputs the user instruction into the NLP semantic parser for parsing. For example, if the instruction is "I want to start the air conditioner", the semantic parser needs to find the air conditioner after parsing the instruction. However, in case of failure of the air conditioner, power failure and network outage, the user cannot control the air conditioner properly. That is, the user cannot perform operations on corresponding resources. In case this kind of problem arises, the system searches for appliances with cooling function, such as the fan, in the user's home appliances as an alternative on the basis of the constructed knowledge graph and properties or functions of resources, for example, refrigeration, cooling, dehumidification of the air conditioner. After finding the alternative device through the knowledge graph, the system sends the corresponding feedback message to the user, saying that "the air conditioner cannot be controlled, start the fan or not".

After the user selects "OK", the NLP semantic parser the user's instruction again and start the fan. That is, in case there is a problem with resource 1, the system finds and recommends other devices with corresponding functions, e.g. resource 5, through the knowledge graph to the user, and schedules resources after receiving the feedback message from the user.

Embodiment III

Figure 6:
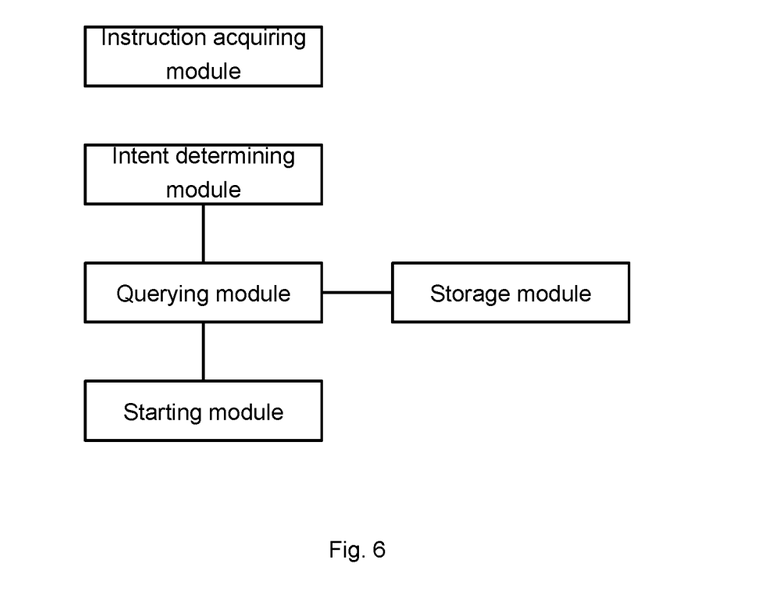
FIG. 6 illustrates a structure diagram of a resource scheduling system according to an embodiment of the disclosure.

A resource scheduling system is provided in the embodiment. FIG. 6 illustrates a structure diagram of a resource scheduling system according to an embodiment of the disclosure. As shown in FIG. 6, the resource scheduling system of the embodiment mainly includes an instruction acquiring module, an intent determining module, a storage module, a querying module and a starting module.

As at least one alternative embodiment, the instruction acquiring module is configured to acquire a control instruction inputted by a user. The intent determining module is configured to determine an intended device on the basis of the control instruction. The storage module is configured to store a constructed knowledge graph which has a plurality of functions stored therein as well as devices associated with the plurality of functions. The querying module is configured to query the constructed knowledge graph for alternative devices associated with the function, with regard to each function of the intended device, in the case where the intended device is not able to be started. The starting module is configured to determine the device to be started from all the alternative devices and start the determined device.

A computer-readable storage medium is further provided in the embodiment. A computer program is stored therein, and the computer program implements the resource scheduling method in the embodiment I or II when executed by a processor.

In the case where the intended device specified by the user is not able to be started, the embodiment is used to reasonably determine alternative devices according to the correlation relationship between the function and the device in the constructed knowledge graph and determine the device to be started from all the alternative devices and start the determined device. It can be seen that the embodiment of the disclosure solves the problem that personalized resource scheduling is unavailable in the related art, improves the personalization of systems, meets the scheduling requirements of different resources, and enhances the user experience. In addition, the system builds a knowledge graph according to the relationship between devices and the user's preference for devices to schedule resources, which makes the scheduling results more inclined to the real choice of the user and helps to further enhance the user experience.

The embodiments described herein are not used for limiting the disclosure, but for explaining the disclosure. Those skilled in the art to which the disclosure belongs may make modifications and changes in the form and details of embodiments without departing from the spirit and scope of the disclosure. However, such modifications and changes shall also be deemed to fall within the protection scope of the disclosure defined in the claims herein.

What is claimed is:

1. A method for starting a device, comprising:
   acquiring a control instruction inputted by a user;
   on a basis of the control instruction, determining an intended device;
   in a case where the intended device is not able to be started, with regard to each function of the intended device, querying a constructed knowledge graph for alternative devices associated with the function, the constructed knowledge graph having a plurality of functions stored therein as well as devices associated with the plurality of functions; and
   determining a device to be started from all the alternative devices as and starting the determined device;
   wherein a connection weight between a function and a device is reflected by a length of a path connecting the function to the device, and the greater the connection weight between the function and the device, the shorter the path connecting the function to the device.

2. The method according to claim 1, wherein the control instruction is a voice instruction, and
   determining the intended device on the basis of the control instruction comprises: performing semantic parsing on the voice instruction, and determining the intended device on the basis of a semantic parsing result.

3. The method according to claim 2, wherein the method further comprises constructing the knowledge graph before obtaining the control instruction inputted by the user, comprising:
   determining a device list to be scheduled, and recording each device in the device list in the knowledge graph;
   summarizing the functions of all devices in the device list into a function list, and recording each function in the function list in the knowledge graph; and
   with regard to each function, connecting the function to devices with the function through a path.

4. The method according to claim 1, wherein determining the device to be started from all the alternative devices comprises:
   showing the user a prompt message which records all the alternative devices;
   receiving a feedback message from the user for the prompt message, wherein the feedback message indicates a device selected by the user from all the alternative devices; and
   determining the device to be started according to the feedback message.

5. The method according to claim 4, wherein the method further comprises constructing the knowledge graph before obtaining the control instruction inputted by the user, comprising:
   determining a device list to be scheduled, and recording each device in the device list in the knowledge graph;
   summarizing the functions of all devices in the device list into a function list, and recording each function in the function list in the knowledge graph; and
   with regard to each function, connecting the function to devices with the function through a path.

6. The method according to claim 1, wherein the knowledge graph further stores a connection weight between a function and a device, and the connection weight increases with increasing of a probability that the user selects the device with regard to the function, and
   determining the device to be started from all the alternative devices comprises:
   sequencing connection weights associated with all the alternative devices; and
   determining an alternative device corresponding to a largest connection weight as the device to be started.

7. The method according to claim 6, wherein the method further comprises constructing the knowledge graph before obtaining the control instruction inputted by the user, comprising:

determining a device list to be scheduled, and recording each device in the device list in the knowledge graph;

summarizing the functions of all devices in the device list into a function list, and recording each function in the function list in the knowledge graph; and with regard to each function, connecting the function to devices with the function through a path.

8. The method according to claim 1, wherein the method further comprises constructing the knowledge graph before obtaining the control instruction inputted by the user, comprising:

determining a device list to be scheduled, and recording each device in the device list in the knowledge graph;

summarizing the functions of all devices in the device list into a function list, and recording each function in the function list in the knowledge graph; and with regard to each function, connecting the function to devices with the function through a path.

9. The method according to claim 8, wherein constructing the knowledge graph further comprises:

with regard to each function, performing the following steps:

acquiring a record of selecting the device by the user for the function; and on the basis of the record, determining connection weights between the function and the respective devices with the function, and adjusting path lengths between the function and the respective devices with the function based on the connection weights.

10. The method according to claim 1, wherein the method further comprises constructing the knowledge graph before obtaining the control instruction inputted by the user, comprising:

determining a device list to be scheduled, and recording each device in the device list in the knowledge graph;

summarizing the functions of all devices in the device list into a function list, and recording each function in the function list in the knowledge graph; and with regard to each function, connecting the function to devices with the function through a path.

11. The method according to claim 1, wherein the method further comprises constructing the knowledge graph before obtaining the control instruction inputted by the user, comprising:

determining a device list to be scheduled, and recording each device in the device list in the knowledge graph;

summarizing the functions of all devices in the device list into a function list, and recording each function in the function list in the knowledge graph; and with regard to each function, connecting the function to devices with the function through a path.

12. A system for starting a device, comprising one or more processors; and a storage apparatus, configured to store one or more programs, wherein the one or more processors implement following actions when executing the one or more programs:

one or more processors; and a storage apparatus, configured to store one or more programs, wherein the one or more processors implement following actions when executing the one or more programs;

acquiring a control instruction inputted by a user;

on a basis of the control instruction, determining an intended device;

in a case where the intended device is not able to be started, with regard to each function of the intended device, querying a constructed knowledge graph for alternative devices associated with the function, the constructed knowledge graph having a plurality of functions stored therein as well as devices associated with the plurality of functions; and determining a device to be started from all the alternative devices as and starting the determined device;

wherein a connection weight between a function and a device is reflected by a length of a path connecting the function to the device, and the greater the connection weight between the function and the device, the shorter the path connecting the function to the device.

13. A computer-readable storage medium, wherein a computer program is stored therein, and the computer program implements a method for starting a device according to following actions when executed by a processor:

acquiring a control instruction inputted by a user;

on a basis of the control instruction, determining an intended device;

in a case where the intended device is not able to be started, with regard to each function of the intended device, querying a constructed knowledge graph for alternative devices associated with the function, the constructed knowledge graph having a plurality of functions stored therein as well as devices associated with the plurality of functions; and determining a device to be started from all the alternative devices as and starting the determined device, wherein a connection weight between a function and a device is reflected by a length of a path connecting the function to the device, and the greater the connection weight between the function and the device, the shorter the path connecting the function to the device.

* * * * *